(12) United States Patent
Ito

(10) Patent No.: US 9,015,095 B2
(45) Date of Patent: Apr. 21, 2015

(54) NEURAL NETWORK DESIGNING METHOD AND DIGITAL-TO-ANALOG FITTING METHOD

(71) Applicant: Fujitsu Limited, Kawasaki-shi (JP)

(72) Inventor: Toshio Ito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 258 days.

(21) Appl. No.: 13/650,928

(22) Filed: Oct. 12, 2012

(65) Prior Publication Data

US 2013/0268473 A1    Oct. 10, 2013

(30) Foreign Application Priority Data

Jan. 25, 2012    (JP) ................. 2012-013485

(51) Int. Cl.
    G06E 1/00      (2006.01)
    G06E 3/00      (2006.01)
    G06F 15/18     (2006.01)
    G06G 7/00      (2006.01)
    G06N 3/00      (2006.01)
    G06N 3/04      (2006.01)

(52) U.S. Cl.
    CPC .............. G06N 3/0445 (2013.01); G06N 3/049 (2013.01)

(58) Field of Classification Search
    None
    See application file for complete search history.

(56) References Cited

U.S. PATENT DOCUMENTS

| | | |
|---|---|---|
| 5,517,595 A | 5/1996 | Kleijn |
| 5,956,702 A | 9/1999 | Matsuoka et al. |
| 6,202,049 B1 | 3/2001 | Kibre et al. |
| 2004/0162644 A1* | 8/2004 | Torii et al. .............. 701/1 |
| 2005/0197985 A1* | 9/2005 | Tani .................. 706/30 |
| 2010/0010948 A1* | 1/2010 | Ito et al. ............. 706/20 |
| 2013/0041859 A1* | 2/2013 | Esterlilne ............. 706/25 |

FOREIGN PATENT DOCUMENTS

| | | |
|---|---|---|
| JP | 07-234697 | 9/1995 |
| JP | 09-073440 | 3/1997 |
| JP | 2000-310997 | 11/2000 |

OTHER PUBLICATIONS

Global Exponential Periodicity of a Class of Recurrent Neural Networks With Oscillating Parameters and Time-Varying Delays Boshan Chen and Jun Wang, Senior Member, IEEE IEEE Transactions on Neural Networks, vol. 16, No. 6, Nov. 2005.*

"Global Asymptotical Stability of Recurrent Neural Networks With Multiple Discrete Delays and Distributed Delays" Jinde Cao, Kun Yuan, and Han-Xiong Li Manuscript received Mar. 14, 2005; revised Feb. 1, 2006. Digital Object Identifier 10.1109/TNN.2006.881488; 1045-9227/$20.00 © 2006 IEEE.*

Fumio Nagashima; "A Bilinear Time Delay Neural Network Model for a Robot Software System", Journal of Robotics Society of Japan, vol. 24, No. 6, pp. 54-64 (2006).

* cited by examiner

Primary Examiner — Kakali Chaki
Assistant Examiner — Luis Sitiriche
(74) Attorney, Agent, or Firm — Fujitsu Patent Center

(57) ABSTRACT

A neural network designing method forms a RNN (Recurrent Neural Network) circuit to include a plurality of oscillating RNN circuits configured to output natural oscillations, and an adding circuit configured to obtain a sum of outputs of the plurality of oscillating RNN circuits, and inputs discrete data to the plurality of oscillating RNN circuits in order to compute a fitting curve with respect to the discrete data output from the adding circuit.

10 Claims, 7 Drawing Sheets

NEURAL NETWORK DESIGNING METHOD AND DIGITAL-TO-ANALOG FITTING METHOD

CROSS-REFERENCE TO RELATED APPLICATIONS

This application is based upon and claims the benefit of priority of the prior Japanese Patent Application No. 2012-013485, filed on Jan. 25, 2012, the entire contents of which are incorporated herein by reference.

FIELD

The embodiments discussed herein are related to a neural network designing method, a digital-to-analog fitting method, and a computer-readable storage medium having stored therein a program for causing a computer to execute a neural network designing process.

BACKGROUND

A RNN (Recurrent Neural Network) is a kind of neural network developed for applications to robot operations and the like. However, the RNN is not only applicable to robot operations, but is also applicable to physical models of various electronic apparatuses including a pedometer, a speech analysis apparatus, and the like. The RNN itself is proposed in Fumio Nagashima, "A Bilinear Time Delay Neural Network Model for a Robot Software System", Journal of Robotics Society of Japan, Vol. 24, No. 6, pp. 54-64, 2006, for example.

The RNN is a network including a neuron and connections, and may be expressed by a relational formula of the neuron and input and output connections, as illustrated in FIG. 1. In FIG. 1, $\epsilon_i$ denotes a delay parameter, $y_i$ and $y_j$ denote neuron state quantities, $C_{ij}$ denotes a weighting coefficient, t denotes the time, and the neuron state quantity $y_i$ may be regarded as being the same as the neuron.

A relational formula illustrated in FIG. 2 may be conceivable as an expansion of the relational formula illustrated in FIG. 1. FIG. 2 illustrates that, in addition to the structure illustrated in FIG. 1, a value $g_i$ is input to the neuron $y_i$, where the value $g_i$ is a value obtained by other than a neuron of a RNN circuit.

FIG. 3 is a diagram for explaining an example of the RNN circuit. The RNN circuit illustrated in FIG. 3 includes two (2) neurons and five (5) connections. In FIG. 3, $\epsilon_i=1$, and a value "1" indicated beside the connection denotes the weighting coefficient. A top right portion of FIG. 3 illustrates a differential equation of the RNN circuit, and a bottom right portion of FIG. 3 illustrates a solution that is obtained when the differential equation is solved. Solving this differential equation may physically correspond to obtaining a locus (or moving distance) $y_1$ (t) when an acceleration g(t) is given, for example. Accordingly, the RNN circuit illustrated in FIG. 3 may obtain the locus from the acceleration, and it may be seen that this RNN circuit employs an analog concept since the input and output of the RNN circuit are represented as a function of continuous time t.

On the other hand, an acceleration sensor is configured to output a value for every unit time, and output values are discrete (or digital) values, as illustrated in FIG. 4, for example. FIG. 4 is a diagram illustrating an example of the output values of the acceleration sensor. In FIG. 4, the ordinate indicates the output value of the acceleration sensor in arbitrary units, and the abscissa indicates the time in arbitrary units. FIG. 4 illustrates output values $y_1$ to $y_{10}$ at times $t_0$ to $t_{10}$.

Hence, even when the discrete output values of the acceleration sensor are to be substituted into the RNN circuit illustrated in FIG. 3 as the acceleration, it is impossible to input the discrete output values of the acceleration sensor to the RNN circuit which employs the analog concept.

In order to substitute the discrete values into the RNN circuit illustrated in FIG. 3, an analog curve fitted to the discrete values may be created, as illustrated in FIG. 5, for example. FIG. 5 is a diagram illustrating an example of the analog curve fitted to the discrete values. In FIG. 5, those parts that are the same as those corresponding parts in FIG. 4 are designated by the same reference numerals, and a description thereof will be omitted. The analog curve fitted to the discrete values may be created by connecting each of the discrete values by line segments, or by fitting a spline curve to the discrete values.

Accordingly, if it were possible to realize a RNN circuit that outputs a fitting curve when the discrete values are input thereto, such a RNN circuit may be connected to the RNN circuit illustrated in FIG. 3, for example, so that various outputs may be generated. FIG. 6 is a diagram schematically illustrating the RNN circuit that outputs the fitting curve in response to the discrete values input thereto. For example, when the RNN circuit illustrated in FIG. 6 that performs a digital-to-analog conversion is connected to the RNN circuit illustrated in FIG. 3, the locus may be output from the discrete output values of the acceleration sensor. However, it may be readily understood from the following reasons that it is difficult to realize a RNN circuit that outputs a curve connecting each of the discrete values by line segments, or a spline curve, based on the discrete values that are input thereto.

In other words, the curve that connects each of the discrete points by the line segments cannot be differentiated at the discrete points. However, all curves that are obtained as the output of the RNN circuit can be differentiated at the discrete points. Hence, the curve that connects each of the discrete values by the line segments is not obtainable as an output of the RNN circuit.

On the other hand, the spline curve connects each of the discrete points by a polynomial curve, and the polynomial curve may be output from the RNN circuit. However, because the polynomial curve is modified between the discrete points, the weighting coefficient of each connection of the RNN circuit need to be modified between the discrete points, to thereby make the processing extremely complex.

The applicant is aware of Japanese Laid-Open Patent Publications No. 2000-310997, No. 7-234697, and No. 9-73440.

Therefore, it is conventionally difficult to realize a RNN circuit that outputs a fitting curve based on discrete values that are input thereto.

SUMMARY

Accordingly, it is an object in one aspect of the embodiment to provide a neural network designing method, a digital-to-analog fitting method, and a computer-readable storage medium, that may realize a RNN circuit that outputs a fitting curve based on discrete values that are input thereto.

According to one aspect of the embodiment, a neural network designing method may include a forming procedure causing a computer to form a RNN (Recurrent Neural Network) circuit to include a plurality of oscillating RNN circuits configured to output natural oscillations, and an adding circuit configured to obtain a sum of outputs of the plurality of oscillating RNN circuits; and a computing procedure causing the computer to input discrete data to the plurality of oscillating RNN circuits, in order to compute a fitting curve with respect to the discrete data output from the adding circuit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be described with reference to the accompanying drawings.

A description will now be given of the neural network designing method, the digital-to-analog fitting method, and the computer-readable storage medium in each embodiment according to the present invention.

In the neural network designing method, the digital-to-analog fitting method, and the computer-readable storage medium in one embodiment, a RNN (Recurrent Neural Network) circuit, that is a design target, is formed to include a plurality of oscillating RNN circuits outputting natural oscillations, and a adding circuit obtaining a sum of the outputs of the plurality of oscillating RNN circuits. Discrete data may be input to the plurality of oscillating RNN circuits, in order to compute a fitting curve with respect to the discrete data output from the adding circuit. Hence, it is possible to realize a digital-to-analog fitting using the RNN circuit.

Figure 6:
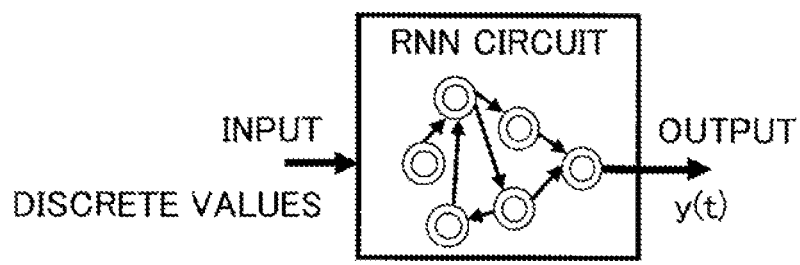
FIG. 6 is a diagram schematically illustrating a RNN circuit that outputs a fitting curve in response to the discrete values input thereto.

For example, even when the RNN circuit illustrated in FIG. 6 may be realized and this RNN circuit may output a fitting curve based on discrete values input thereto, the fitting curve preferably satisfies an averaging process represented by the following formula (1).

$$\int_0^{10} y(t)dt = \sum_{i=0}^{10} y_i \quad (1)$$

However, when obtaining an average of the fitting curve y(t), the amount of computation becomes large, the load of the computation process becomes large, and the computation time becomes long when an integral of the left term of y(t) in the formula (1) above is computed directly.

On the other hand, the present inventor conceived that, as long as the conditions of the formula (1) above are satisfied, the integral of the fitting curve y(t) (that is, an average of the fitting curve y(t)) may be obtained by adding original discrete points (that is, averaging the discrete points), even when the integral of the fitting curve y(t) is not computed directly. In addition, the present inventor conceived that the amount of computation is greatly reduced, the load of the computation is reduced, and the computation time is reduced, by obtaining the integral of the fitting curve y(t) from the sum of the original discrete points.

Hence, according to the neural network designing method, the digital-to-analog fitting method, and the computer-readable storage medium in one embodiment, the RNN circuit is formed to include a plurality of oscillating RNN circuits outputting natural oscillations, and a adding circuit obtaining a sum of the outputs of the plurality of oscillating RNN circuits, in order to output a fitting curve with respect to the original discrete points, satisfying the averaging process represented by the formula (1).

Figure 7:
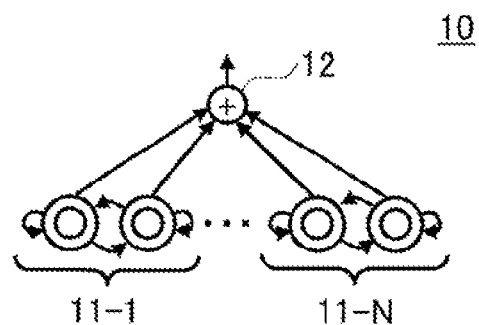
FIG. 7 is a diagram illustrating an example of an RNN circuit used in one embodiment.

FIG. 7 is a diagram illustrating an example of a RNN circuit used in one embodiment. In FIG. 7, a RNN circuit 10 includes a plurality of oscillating RNN circuits 11-1 through 11-N (N is a natural number greater than or equal to 2) configured to output natural oscillations, and a adding circuit 12 configured to obtain a sum of the outputs of the plurality of oscillating RNN circuits 11-1 through 11-N.

Figure 8:
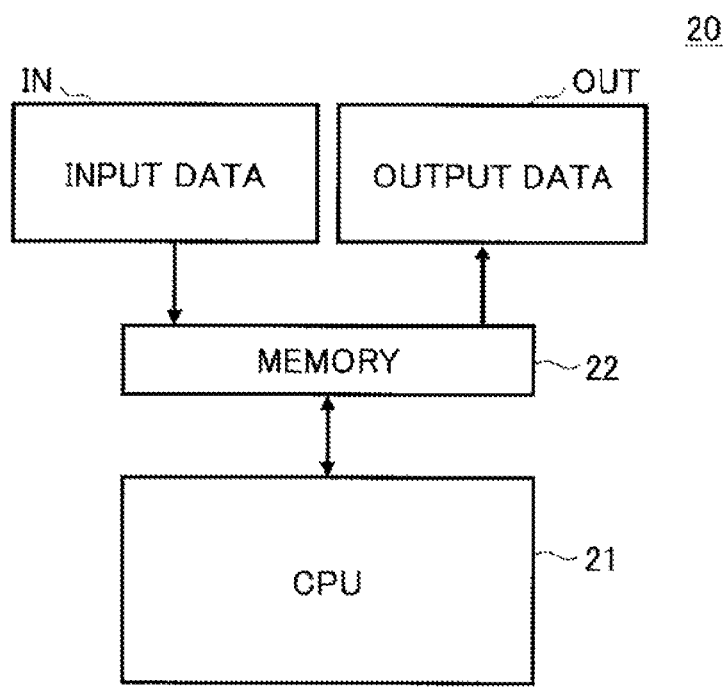
FIG. 8 is a block diagram for explaining a neural network designing method in one embodiment, for a case in which the fitting curve is output based on the discrete values that are input.

FIG. 8 is a block diagram for explaining the neural network designing method in one embodiment, for a case in which the fitting curve is output based on the discrete values that are input. In FIG. 8, an input data IN is input to a PC (Personal Computer) 20, and an output data OUT is output from the PC 20. The PC 20 is an example of a general-purpose computer. The input data IN may be a discrete value (or discrete data) output from an acceleration sensor (not illustrated), for example. On the other hand, the output data OUT may be an acceleration fitting curve or a locus curve generated with respect to the input data IN, by the RNN circuit 10 illustrated in FIG. 7, or by a combination of the RNN circuit 10 and another RNN circuit such as that illustrated in FIG. 3, for example. In this example, the PC 20 includes a CPU (Central Processing Unit) 21 that is an example of a processor, and a memory 22 that is an example of a storage unit. The input data IN input to the PC 20 may be stored in the memory 22 as an input data file. In addition, the output data OUT output from the PC 20 may be stored in the memory 22 as an output data file. In the combination of the RNN circuit 10 and the other RNN circuit such as that illustrated in FIG. 3, the output of the RNN circuit 10 may be input to the other RNN circuit, for example.

The memory 22 may store the input data IN to the PC 20, the output data OUT from the PC 20, and a program of the RNN circuit. The program of the RNN circuit causes the CPU 21 to execute a process of the RNN circuit 10, or a process of the combination of the RNN circuit 10 and the other RNN circuit. The CPU 21 computes the acceleration fitting curve or the locus curve, based on the program and the input data IN stored in the memory 22. The acceleration fitting curve or the locus curve that is computed is stored in the memory 22 to be output as the output data OUT. As an application of the output data OUT output from the CPU 21, the output data OUT (locus curve) may be input to a robot (not illustrated), for example, in order to cause the robot to move along the locus curve.

Figure 9:
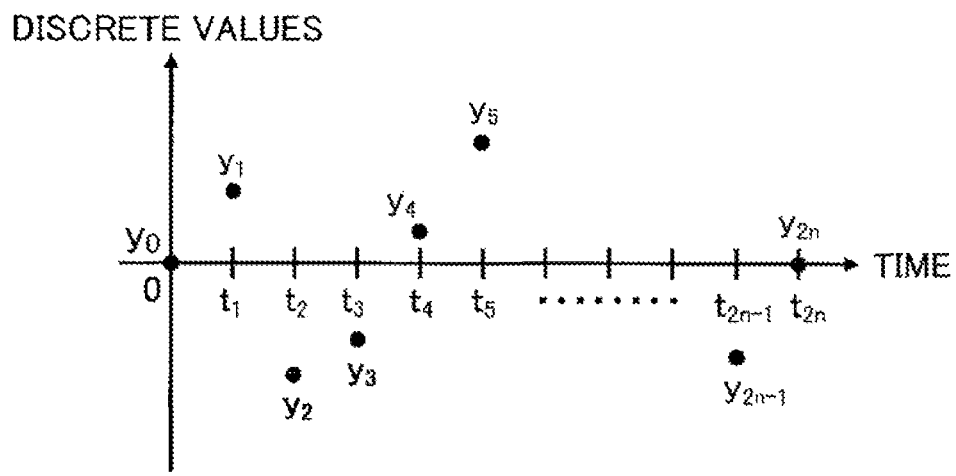
FIG. 9 is a diagram illustrating an example of the discrete values.

A data length may be set when inputting the input data IN, that is, the discrete data, to the PC 20. In a case in which the actual data length is an odd number 2n−1 (n is a natural number greater than or equal to 2) as illustrated in FIG. 9, the data length of the input data IN is set to an even number 2n greater than the actual data length 2n−1. In other words, if the actual data length of the input data IN is the odd number 2n−1 when forming the RNN circuit 10, the data length is set to the even number 2n that is greater than the actual data length 2n−1. FIG. 9 is a diagram illustrating an example of the discrete values of the discrete data. In FIG. 9, the ordinate indicates the discrete value in arbitrary units, and the abscissa indicates the time in arbitrary units. In addition, end points $y_0$ and $y_{2n}$ are set to $y_0=0$ and $y_{2n}=0$.

Next, $a_0, a_1, \ldots, a_{2n-1}, b_1, \ldots, b_{2n-1}$ represented by the following formulas (2) are computed from the discrete data $y_0=0, y_1, \ldots, y_{2n-1}, y_{2n}=0$, and stored in the memory 22.

$$a_0 = \frac{1}{2n}\sum_{i=1}^{2n-1} y_i = \frac{1}{2n}\sum_{i=0}^{2n} y_i \quad (2)$$

$$a_q = \frac{\psi\left(\frac{q}{2n}\right)}{4n\pi^2}\sum_{i=1}^{2n-1} y_i\left(-\cos\frac{(i-1)q\pi}{n} + 2\cos\frac{iq\pi}{n} - \cos\frac{(i+1)q\pi}{n}\right)$$

$$q = 1, 2 \ldots 2n-1$$

$$b_q = \frac{\psi\left(\frac{q}{2n}\right)}{4n\pi^2}\sum_{i=1}^{2n-1} y_i\left(-\sin\frac{(i-1)q\pi}{n} + 2\sin\frac{iq\pi}{n} - \sin\frac{(i+1)q\pi}{n}\right)$$

$$q = 1, 2 \ldots 2n-1$$

$$\psi(x) = \frac{d^2}{dx^2}\log\Gamma(x)$$

In the formulas (2) above, $\psi(x)$ denotes a trigamma function that is defined by a second derivative of a logarithm of a gamma function.

Further, $a_0, a_1, \ldots, a_{2n-1}, b_1, \ldots, b_{2n-1}$ obtained from the formulas (2) are fixed values independent of the time t. These fixed values $a_0, a_1, \ldots, a_{2n-1}, b_1, b_{2n-1}$ may be used to define the fitting curve according to the following formula (3).

$$y(t) = a_0 + \sum_{q=1}^{2n-1} a_q\cos\frac{q\pi}{n}t + \sum_{q=1}^{2n-1} b_q\sin\frac{q\pi}{n}t \quad (3)$$

In the formula (3) above, $\cos(q\pi t/n)$ and $\sin(q\pi t/n)$ are oscillating functions output the plurality of oscillating RNN circuits 11-1 through 11-N. The fitting curve may be obtained by combining these oscillating functions. In addition, it may be confirmed from the following transformation formula (4) that the fitting curve defined by the formula (3) satisfies the averaging process represented by the formula (1).

$$\int_0^{2n} y(t)dt = \quad (4)$$

$$\int_0^{2n}\left(a_0 + \sum_{q=1}^{2n-1} a_q\cos\frac{q\pi}{n}t + \sum_{q=1}^{2n-1} b_q\sin\frac{q\pi}{n}t\right)dt = \int_0^{2n} a_0 dt = \sum_{i=0}^{2n} y_i$$

Figure 10:
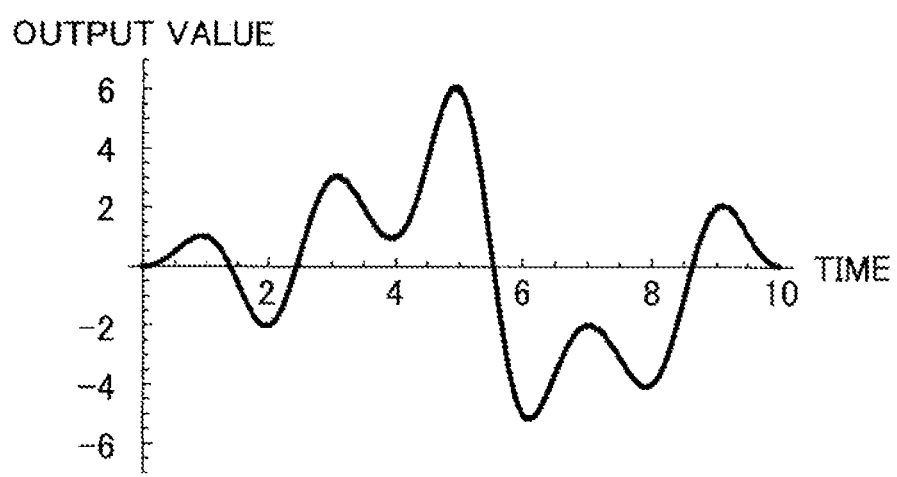
FIG. 10 is a diagram illustrating an example of a fitting curve of the discrete values.

Next, a description will be given of a particular example to confirm whether the function defined by the formula (3) above represents the fitting curve of the discrete values. In a case in which n=5 and $y_0=0, y_1=1, y_2=2, y_3=3, y_4=1, y_5=6, y_6=-5, y_7=-2, y_8=-4, y_9=2$, and $y_{10}=0$, for example, a curve illustrated in FIG. 10 becomes the fitting curve defined by the formula (3), and it may be confirmed that the curve fits the given discrete values. FIG. 10 is a diagram illustrating an example of the fitting curve of the discrete values. In FIG. 10, the ordinate indicates the output value in arbitrary units, and the abscissa indicates the time in arbitrary units.

Figure 11:
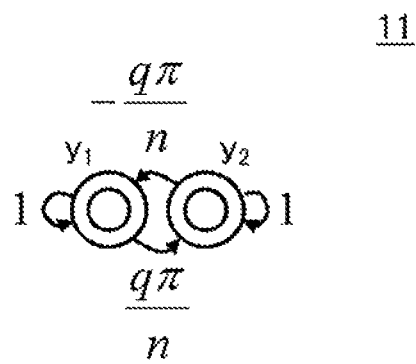
FIG. 11 is a diagram illustrating an example of an oscillating RNN circuit.

Next, a description will be given of the RNN circuit that outputs the fitting curve defined by the formula (3) above. FIG. 11 is a diagram illustrating an example of an oscillating RNN circuit. The following formulas (5) correspond to a representation of a process of an oscillating RNN circuit 11 illustrated in FIG. 11 by differential equations, and the following formulas (6) correspond to solutions of the differential equations, output from the oscillating RNN circuit 11. The oscillating RNN circuit 11 illustrated in FIG. 11 may obtain the functions $\cos(q\pi t/n)$ and $\sin(q\pi t/n)$.

$$\frac{dy_1}{dt} = -\frac{q\pi}{n}y_2 \quad (5)$$

$$\frac{dy_2}{dt} = \frac{q\pi}{n}y_1$$

$$y_1(t) = \cos\frac{q\pi}{n}t \quad (6)$$

$$y_2(t) = \sin\frac{q\pi}{n}t$$

Figure 12:
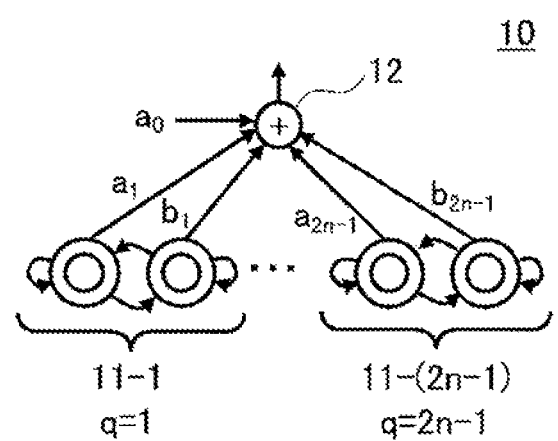
FIG. 12 is a diagram illustrating an example of the RNN circuit for outputting the fitting curve.

FIG. 12 is a diagram illustrating an example of the RNN circuit for outputting the fitting curve defined by the formula (3) above. The RNN circuit 10 illustrated in FIG. 12 obtains the sum of the outputs of 2n−1 (n is a natural number greater than or equal to 2) oscillating RNN circuits 11-1 through 11-(2n−1) by the adding circuit 12, in order to compute the fitting curve with respect to the input discrete data. In addition, the values of $a_0, a_1, \ldots, a_{2n-1}, b_1, \ldots, b_{2n-1}$ in the formulas (2) above, that are obtained from the discrete data $y_0=0, y_1, \ldots, y_{2n-1}, y_{2n}=0$, are the weighting coefficients of the connections of the RNN circuit. Hence, according to the RNN circuit 10, it is unnecessary to modify the weighting coefficient of each connection of the RNN circuit, to thereby enable the computation process to be simplified. In addition, according to the RNN circuit 10, the fitting curve may be output based on the input discrete data, and the fitting curve that is output may satisfy the averaging process represented by the formula (1) above, for example.

Figure 13:
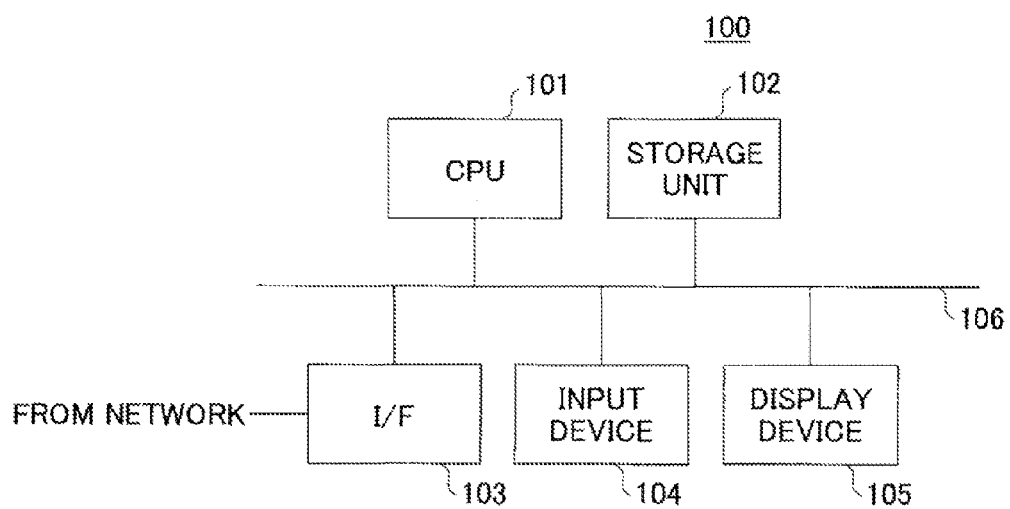
FIG. 13 is a block diagram illustrating an example of a computer system.

FIG. 13 is a block diagram illustrating an example of a computer system. A computer system 100 illustrated in FIG. 13 includes a CPU 101, a storage unit 102, an interface (I/F) 103, an input device 104, and a display device 105 that are connected via a bus 106. The CPU 101 may execute a program stored in the storage unit 102 and control the entire computer system 100. The storage unit 102 may be formed by a semiconductor memory device, a magnetic recording medium, an optical recording medium, a magneto-optic recording medium, and the like. The storage unit 102 may store the program described above and various kinds of data. The storage unit 102 may also function as a temporary memory to temporarily store intermediate results and computation results of the computations executed by the CPU 101. The storage unit 102 may further store the input data to the computer system 100 and the output data from the computer system 100. The CPU 101 and the storage unit 102 respectively correspond to the CPU 21 and the memory 22 illustrated in FIG. 8.

The I/F 103 may receive the program and the data to be stored in the storage unit 102, via a network (not illustrated). The input device 104 may be formed by a keyboard or the like. The display device 105 may be formed by a display unit, a display panel, or the like. The input device 104 and the display device 105 may be formed by an input and output device having the functions of both the input device 104 and the display device 105, such as a touch-screen panel integrally having an input device and a display device.

The CPU 101 may execute the program stored in the storage unit 102 in order to cause the computer system 100 to function as an apparatus for designing a neural network. The program may cause the CPU 101 to execute procedures of at least a neural network designing process, and this program may be stored in a suitable non-transitory computer-readable storage medium, such as the storage unit 102. In this example, the program causes the CPU 101 to execute a process for forming a RNN circuit that includes at least the plurality of oscillating RNN circuits 11-1 through 11-N (or 11-(2n−1)) to output natural oscillations, and the adding circuit 12 to obtain the sum of the outputs of the plurality of oscillating RNN circuits 11-1 through 11-N (or 11-(2n−1)), as illustrated in FIG. 7 or FIG. 12.

Figure 1:
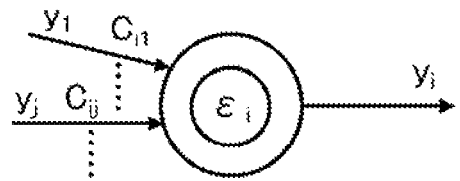
FIG. 1 is a diagram for explaining a relational formula of a neuron and input and output connections.
Figure 2:
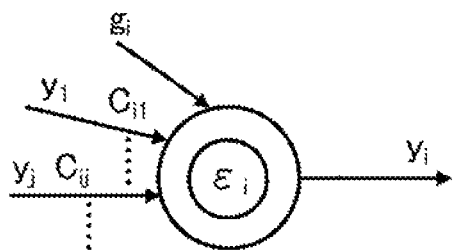
FIG. 2 is a diagram for explaining an expansion of the relational formula illustrated in FIG. 1.
Figure 3:
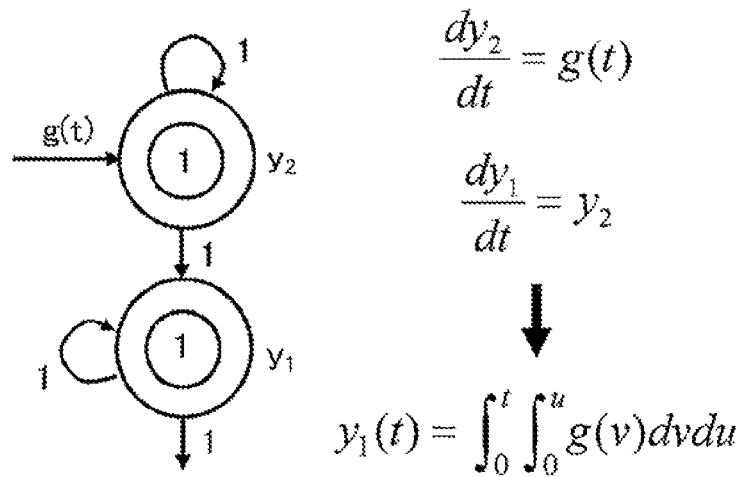
FIG. 3 is a diagram for explaining an example of a RNN circuit.
Figure 4:
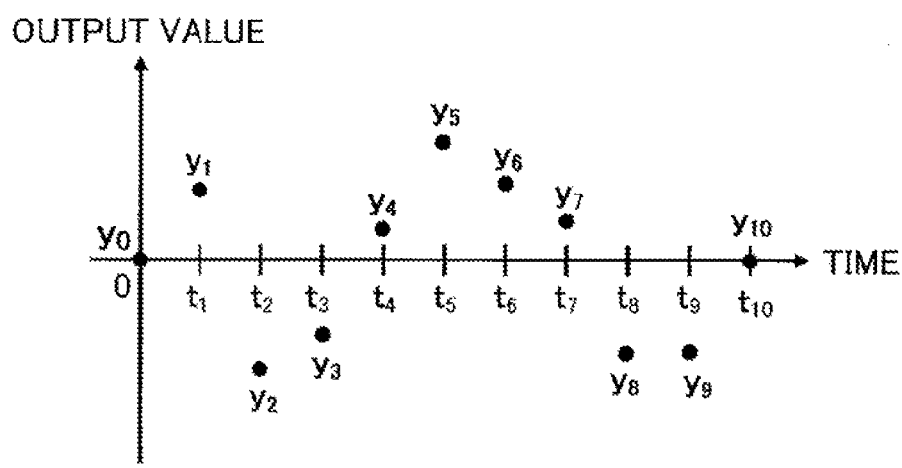
FIG. 4 is a diagram illustrating an example of output values of an acceleration sensor.
Figure 5:
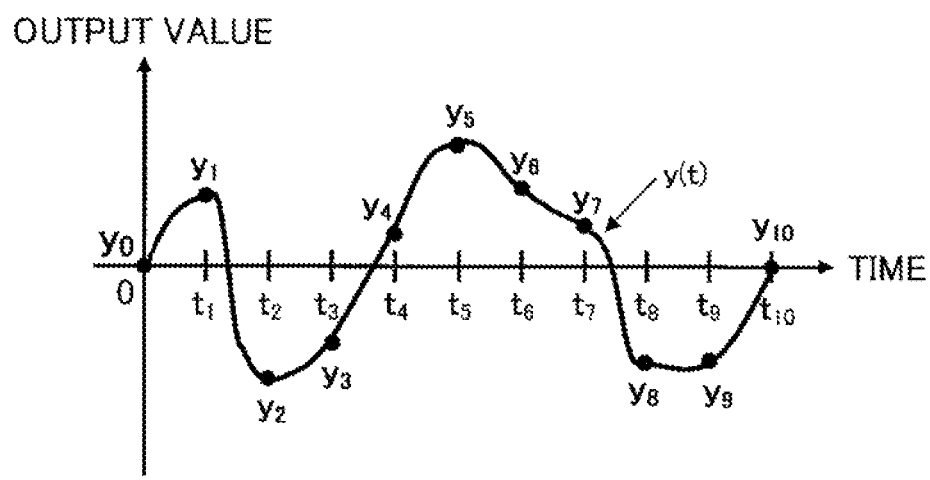
FIG. 5 is a diagram illustrating an example of an analog curve fitted to the discrete values.

The program may cause the CPU 101 to execute a process of the RNN circuit 10 that includes at least the plurality of oscillating RNN circuits 11-1 through 11-N (or 11-(2n−1)) to output natural oscillations, and the adding circuit 12 to obtain the sum of the outputs of the plurality of oscillating RNN circuits 11-1 through 11-N (or 11-(2n−1)), as illustrated in FIG. 7 or FIG. 12, or a process of a combination of the RNN circuit 10 and another RNN circuit such as that illustrated in FIG. 3. In other words, a program that causes the CPU 101 to execute at least the process of the RNN circuit 10 to generate the fitting curve of the discrete values may be provided as a plug-in with respect to the program that causes the CPU 101 to execute the procedures of the neural network designing process. In this case, the program that causes the CPU 101 to execute at least the process of the RNN circuit 10 may cause the CPU 101 to function as a circuit or an apparatus for performing a digital-to-analog fitting method (or process) to output an analog curve fitted to the discrete values.

For example, the output (fitting curve) of the RNN circuit 10 may be displayed on the display device 105, or may be output via the I/F 103 to the outside of the computer system 100.

In the embodiment described above, the application of the RNN circuit to the robot is described. However, the RNN circuit designed by the disclosed method is not limited to the application to driving circuits and the like of robots, and may be applied to various physical models of electronic apparatuses, control circuits, speech analysis circuits, and the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A neural network designing method comprising:
a forming procedure causing a computer to form a RNN (Recurrent Neural Network) circuit to include a plurality of oscillating RNN circuits configured to output natural oscillations, and an adding circuit configured to obtain a sum of outputs of the plurality of oscillating RNN circuits; and
a computing procedure causing the computer to input discrete data to the plurality of oscillating RNN circuits, in order to compute a fitting curve with respect to the discrete data output from the adding circuit,
wherein the computing procedure includes
computing and storing in a storage unit $a_0, a_1, \ldots, a_{2n-1}, b_1, \ldots, b_{2n-1}$ represented by the following formulas from the discrete data $y_0=0, y_1, \ldots, y_{2n-1}, y_{2n}=0$, $$a_0 = \frac{1}{2n} \sum_{i=1}^{2n-1} y_i = \frac{1}{2n} \sum_{i=0}^{2n} y_i$$

$$a_q = \frac{\psi\left(\frac{q}{2n}\right)}{4n\pi^2} \sum_{i=1}^{2n-1} y_i \left(-\cos\frac{(i-1)q\pi}{n} + 2\cos\frac{iq\pi}{n} - \cos\frac{(i+1)q\pi}{n}\right)$$

$$q = 1, 2 \ldots 2n-1$$

$$b_q = \frac{\psi\left(\frac{q}{2n}\right)}{4n\pi^2} \sum_{i=1}^{2n-1} y_i \left(-\sin\frac{(i-1)q\pi}{n} + 2\sin\frac{iq\pi}{n} - \sin\frac{(i+1)q\pi}{n}\right)$$

$$q = 1, 2 \ldots 2n-1$$

$$\psi(x) = \frac{d^2}{dx^2} \log\Gamma(x)$$

where $\psi(x)$ denotes a trigamma function that is defined by a second derivative of a logarithm of a gamma function, and $a_0, a_1, \ldots, a_{2n-1}, b_1, \ldots, b_{2n-1}$ are fixed values independent of the time t, and
computing the fitting curve defined by the following formula, using the fixed values $a_0, a_1, \ldots, a_{2n-1}, b_1, \ldots, b_{2n-1}$, $$y(t) = a_0 + \sum_{q=1}^{2n-1} a_q \cos\frac{q\pi}{n} t + \sum_{q=1}^{2n-1} b_q \sin\frac{q\pi}{n} t$$

where $\cos(q\pi t/n)$ and $\sin(q\pi t/n)$ are oscillating functions output from the plurality of oscillating RNN circuits.

2. The neural network designing method as claimed in claim 1, wherein, when an actual data length of the discrete data is an odd number 2n-1, where n is a natural number greater than or equal to 2, the forming procedure sets a data length of the discrete data to an even number 2n greater than the actual data length.

3. The neural network designing method as claimed in claim 1, wherein the discrete data are acceleration data, and the fitting curve is an acceleration fitting curve or a locus curve.

4. The neural network designing method as claimed in claim 1, wherein a process of each of the plurality of oscillating RNN circuits is represented by the following formulas, and $$\frac{dy_1}{dt} = -\frac{q\pi}{n}y_2$$

$$\frac{dy_2}{dt} = \frac{q\pi}{n}y_1$$

wherein solutions of differential equations output from each of the plurality of oscillating RNN circuits are represented by the following formulas $$y_1(t) = \cos\frac{q\pi}{n}t$$

$$y_2(t) = \sin\frac{q\pi}{n}t.$$

5. A non-transitory computer-readable storage medium having stored therein a program for causing a computer to execute a neural network designing process comprising:

forming a RNN (Recurrent Neural Network) circuit to include a plurality of oscillating RNN circuits configured to output natural oscillations, and an adding circuit configured to obtain a sum of outputs of the plurality of oscillating RNN circuits; and computing to input discrete data to the plurality of oscillating RNN circuits, in order to compute a fitting curve with respect to the discrete data output from the adding circuit, wherein the computing includes computing and storing in a storage unit $a_0, a_1, \ldots, a_{2n-1}, b_1, \ldots, b_{2n-1}$ represented by the following formulas from the discrete data $y_0=0, y_1, \ldots, y_{2n-1}, y_{2n}=0$, $$a_0 = \frac{1}{2n}\sum_{i=1}^{2n-1} y_i = \frac{1}{2n}\sum_{i=0}^{2n} y_i$$

$$a_q = \frac{\psi\left(\frac{q}{2n}\right)}{4n\pi^2}\sum_{i=1}^{2n-1} y_i\left(-\cos\frac{(i-1)q\pi}{n} + 2\cos\frac{iq\pi}{n} - \cos\frac{(i+1)q\pi}{n}\right)$$

$$q = 1, 2 \ldots 2n-1$$

$$b_q = \frac{\psi\left(\frac{q}{2n}\right)}{4n\pi^2}\sum_{i=1}^{2n-1} y_i\left(-\cos\frac{(i-1)q\pi}{n} + 2\cos\frac{iq\pi}{n} - \cos\frac{(i+1)q\pi}{n}\right)$$

$$q = 1, 2 \ldots 2n-1$$

$$\psi(x) = \frac{d^2}{dx^2}\log\Gamma(x)$$

where $\psi(x)$ denotes a trigamma function that is defined by a second derivative of a logarithm of a gamma function, and $a_0, a_1, \ldots, a_{2n-1}, b_1, \ldots, b_{2n-1}$ are fixed values independent of the time t, and computing the fitting curve defined by the following formula, using the fixed values $a_0, a_1, \ldots, a_{2n-1}, b_1, \ldots, b_{2n-1}$, $$y(t) = a_0 + \sum_{q=1}^{2n-1} a_q\cos\frac{q\pi}{n}t + \sum_{q=1}^{2n-1} b_q\sin\frac{q\pi}{n}t$$

where $\cos(q\pi t/n)$ and $\sin(q\pi t/n)$ are oscillating functions output from the plurality of oscillating RNN circuits.

6. The non-transitory computer-readable storage medium as claimed in claim 5, wherein, when an actual data length of the discrete data is an odd number 2n-1, where n is a natural number greater than or equal to 2, the forming sets a data length of the discrete data to an even number 2n greater than the actual data length.

7. The non-transitory computer-readable storage medium as claimed in claim 5, wherein the discrete data are acceleration data, and the fitting curve is an acceleration fitting curve or a locus curve.

8. The non-transitory computer-readable storage medium as claimed in claim 5, wherein a process of each of the plurality of oscillating RNN circuits is represented by the following formulas, and $$\frac{dy_1}{dt} = -\frac{q\pi}{n}y_2$$

$$\frac{dy_2}{dt} = \frac{q\pi}{n}y_1$$

wherein solutions of differential equations output from each of the plurality of oscillating RNN circuits are represented by the following formulas $$y_1(t) = \cos\frac{q\pi}{n}t$$

$$y_2(t) = \sin\frac{q\pi}{n}t.$$

9. A digital-to-analog fitting method using a RNN (Recurrent Neural Network) circuit, comprising:

a first procedure causing a computer to execute a first process to input discrete data to a plurality of oscillating RNN circuits configured to output natural oscillations, in order to compute oscillating functions output from the plurality of RNN circuits; and a second procedure causing the computer to execute a second process to add the oscillating functions output from the plurality of RNN circuits by an adding circuit, in order to compute a fitting curve with respect to the discrete values output from the adding circuit, wherein the first process includes computing and storing in a storage unit $a_0, a_1, \ldots, a_{2n-1}, b_1, \ldots, b_{2n-1}$ represented by the following formulas from the discrete data $y_0=0, y_1, \ldots, y_{2n-1}, y_{2n}=0$, $$a_0 = \frac{1}{2n}\sum_{i=1}^{2n-1} y_i = \frac{1}{2n}\sum_{i=0}^{2n} y_i$$

$$a_q = \frac{\psi\left(\frac{q}{2n}\right)}{4n\pi^2}\sum_{i=1}^{2n-1} y_i\left(-\cos\frac{(i-1)q\pi}{n} + 2\cos\frac{iq\pi}{n} - \cos\frac{(i+1)q\pi}{n}\right)$$

$$q = 1, 2 \ldots 2n-1$$

-continued $$b_q = \frac{\psi\left(\frac{q}{2n}\right)}{4n\pi^2} \sum_{i=1}^{2n-1} y_i \left(-\sin\frac{(i-1)q\pi}{n} + 2\sin\frac{iq\pi}{n} - \sin\frac{(i+1)q\pi}{n}\right)$$

$$q = 1, 2 \ldots 2n-1$$

$$\psi(x) = \frac{d^2}{dx^2} \log\Gamma(x)$$

where $\psi(x)$ denotes a trigamma function that is defined by a second derivative of a logarithm of a gamma function, and $a_0, a_1, \ldots, a_{2n-1}, b_1, \ldots, b_{2n-1}$ are fixed values independent of the time t, and computing the fitting curve defined by the following formula, using the fixed values $a_0, a_1, \ldots, a_{2n-1}, b_1, \ldots, b_{2n-1}$, $$y(t) = a_0 + \sum_{q=1}^{2n-1} a_q \cos\frac{q\pi}{n}t + \sum_{q=1}^{2n-1} b_q \sin\frac{q\pi}{n}t$$

where $\cos(q\pi t/n)$ and $\sin(q\pi t/n)$ are oscillating functions output from the plurality of oscillating RNN circuits.

10. The digital-to-analog fitting method as claimed in claim 9, wherein a process of each of the plurality of oscillating RNN circuits is represented by the following formulas, and $$\frac{dy_1}{dt} = -\frac{q\pi}{n} y_2$$

$$\frac{dy_2}{dt} = \frac{q\pi}{n} y_1$$

wherein solutions of differential equations output from each of the plurality of oscillating RNN circuits are represented by the following formulas $$y_1(t) = \cos\frac{q\pi}{n}t$$

$$y_2(t) = \sin\frac{q\pi}{n}t.$$

* * * * *